United States Patent
Aigner

(10) Patent No.: US 9,183,975 B2
(45) Date of Patent: Nov. 10, 2015

(54) LINEAR BEARING, AND SOLENOID COMPRISING SUCH A LINEAR BEARING

(71) Applicant: Roland Aigner, Zurich (CH)

(72) Inventor: Roland Aigner, Zurich (CH)

(73) Assignee: BURCKHARDT COMPRESSION AG (CH)

( * ) Notice: Subject to any disclaimer, the term of this patent is extended or adjusted under 35 U.S.C. 154(b) by 0 days.

(21) Appl. No.: 14/373,021

(22) PCT Filed: Jan. 18, 2013

(86) PCT No.: PCT/EP2013/050916
§ 371 (c)(1),
(2) Date: Jul. 17, 2014

(87) PCT Pub. No.: WO2013/107852
PCT Pub. Date: Jul. 25, 2013

(65) Prior Publication Data
US 2015/0084725 A1     Mar. 26, 2015

(30) Foreign Application Priority Data
Jan. 18, 2012 (EP) ..................................... 12151564

(51) Int. Cl.
*H01F 7/126*     (2006.01)
*F16F 1/10*      (2006.01)
(Continued)

(52) U.S. Cl.
CPC ........ *H01F 7/126* (2013.01); *F16F 1/10* (2013.01); *F16F 3/02* (2013.01); *F16F 3/023* (2013.01); *H01F 7/16* (2013.01)

(58) Field of Classification Search
CPC ............... F16F 1/027; F16F 1/10; F16F 3/02; F16F 3/023; H01F 7/16; H01F 7/126
See application file for complete search history.

(56) References Cited

U.S. PATENT DOCUMENTS

| | | |
|---|---|---|
| 3,462,136 A | 8/1969 | Rumsey |
| 5,125,443 A * | 6/1992 | Schwartzman ................. 152/84 |
| 5,522,214 A | 6/1996 | Beckett |

(Continued)

FOREIGN PATENT DOCUMENTS

| | | |
|---|---|---|
| DE | 102009035444 B4 | 12/2011 |
| FR | 2621971 A1 | 4/1989 |
| WO | 2011012638 A3 | 2/2011 |

Primary Examiner — Mohamad Musleh
(74) Attorney, Agent, or Firm — Fish & Tsang, LLP

(57) ABSTRACT

The linear bearing (3) comprises a plurality of concentrically arranged springs (2), each spring (2) being designed as a plate spring with a fixing part (2a) and a bore (2c) arranged in the center (Z). Each spring (2) also has a spring arm (2b) which emerges from the fixing part (2a) and ends in an end section (2g). The end section (2g) has the bore (2c), and the bore (2c) is concentric to the fixing part (2a). Each spring (2) has a direction of movement (B) which runs perpendicular to the fixing part (2a), and the springs (2) are arranged one behind the other in the direction of movement (B). The spring arm (2b) has a spring arm section (2ba) which runs concentrically with the bore (2c) and which extends along an angular range ($\gamma$) between 100° and 270°, preferably along an angular range ($\gamma$) between 180° and 300°. The fixing part (2a) is at least partly annular, and the spring arm section (2ba) has, in a radial direction with respect to the bore (2c), a width (2k) which is at least five times greater than the thickness (2i) of the spring arm (2b). The width (2k) of the spring arm section (2ba) is designed such that the spring arm section extends relative to the annular fixing part (2a) and the end portion (2g) while forming a lateral gap (2d).

14 Claims, 5 Drawing Sheets

(51) Int. Cl.
*F16F 3/02* (2006.01)
*H01F 7/16* (2006.01)

(56) References Cited

U.S. PATENT DOCUMENTS

| | | | |
|---|---|---|---|
| 5,895,033 A | 4/1999 | Ross | |
| 6,050,556 A * | 4/2000 | Masuda et al. | 267/161 |
| 6,129,527 A * | 10/2000 | Donahoe et al. | 417/416 |
| 6,443,183 B1 * | 9/2002 | Roorda | 137/529 |
| 6,813,225 B2 * | 11/2004 | Widdowson et al. | 369/44.15 |
| 7,439,641 B2 * | 10/2008 | Ogino et al. | 310/15 |
| 8,960,655 B2 * | 2/2015 | Wood | 267/159 |
| 2005/0135946 A1 * | 6/2005 | Kang et al. | 417/416 |
| 2006/0219514 A1 * | 10/2006 | Matsumura et al. | 192/84.94 |
| 2009/0007560 A1 * | 1/2009 | Inoshiri | 60/517 |
| 2012/0160091 A1 * | 6/2012 | Dadd et al. | 92/132 |

* cited by examiner

LINEAR BEARING, AND SOLENOID COMPRISING SUCH A LINEAR BEARING

This application is a US national phase based on PCT/EP2013/050916 which claims priority to International Patent Application with the serial number PCT/EP2013/050916 which was filed 18 Jan. 2013.

The invention relates to a linear bearing in accordance with the preamble of claim 1. The invention further relates to a solenoid comprising a linear bearing in accordance with the preamble of claim 11.

BACKGROUND OF THE INVENTION

The document U.S. Pat. No. 5,895,033 and the document U.S. Pat. No. 5,522,214 respectively disclose a linear bearing comprising a plurality of concentrically arranged springs, wherein each spring is configured as a disk spring, and wherein each spring has a spring arm extending in a spiral manner. These linear bearings have the disadvantage that the properties of the linear guidance are not satisfactory.

SUMMARY OF THE INVENTION

It is the object of the invention to form an improved linear bearing, as well as a solenoid comprising an improved linear bearing.

This object is satisfied by a linear bearing comprising the features of claim 1. The subordinate claims 2 to 10 relate to further advantageous embodiments. The object is further satisfied by a solenoid comprising the features of claim 11. The subordinate claims 12 to 14 relate to further advantageous embodiments.

The object is in particular satisfied by a linear bearing comprising a plurality of concentrically arranged springs, wherein each spring is configured as a disk spring having a fastening part and having a bore arranged in a center, wherein each spring further comprises a spring arm which, starting from the fastening part, ends in an end section, wherein the end section has the bore; and wherein the bore is concentrically arranged with respect to the fastening part; wherein each spring has a movement direction running perpendicular to the fastening part; and wherein the springs are arranged following one another in the movement direction, wherein the spring arm has a spring arm section running concentrically with respect to the bore, said spring arm section extending over an angular range γ of between 100° and 270° and preferably extending over an angular range γ of between 180° and 300°; wherein the fastening part is configured at least partly ring-shaped; wherein the spring arm section has a width in a radial direction with respect to the bore, said width being at least five times larger than the thickness of the spring arm; and wherein the width of the spring arm is configured in such a way that this extends with respect to the ring-shaped fastening part and the end section on the formation of a lateral gap.

The object is in particular also satisfied by a linear bearing comprising a plurality of concentrically arranged springs, wherein each spring is configured as a disk spring having a fastening part and having a bore arranged in a center, wherein each spring further comprises a spring arm extending, in particular in a spiral manner, starting from a fastening part and ending in an end section; wherein the end section has the bore; and wherein the bore is arranged concentrically with respect to the fastening part; wherein each spring has a movement direction running perpendicular to the fastening part; and wherein the springs are arranged following one another in the movement direction; wherein the spring arm extends over an angular range of between 180° and 300°; and wherein the spring arm has a spring arm section 2ba running concentrically with respect to the bore 2c, said spring arm section extending over an angular range γ of between 100° and 270°; and wherein the fastening part is configured at least partly ring-shaped; and wherein the spring arm has a width in a radial direction with respect to the bore, said width being at least five times as large as the thickness of the spring arm; and wherein the width of the spring arm is configured in such a way that this extends with respect to the ring-shaped fastening part and the end section on the formation of a gap.

The linear bearing in accordance with the invention has the advantage that this is relatively rigid in a radial direction and has a small displaceability in a radial direction, in contrast to which the linear bearing has a relatively large capability of being displaced in the movement direction and/or in the lifting direction which results in the advantage that, for example, a solenoid comprising such a linear bearing has a precise and securely stored solenoid ram.

The spring of the linear bearing is configured in such a way that this has a spring arm section which extends concentrically with respect to the central bore, wherein this spring arm section extends over an angular range of between 100° and 270° and preferably over an angular range of between 180° and 300°. Advantageously, the spring arm section has a constant width. This design has the advantage that the spring arm sections experience an increasing inclination on an increasing deflection of the linear bearing in the movement direction and/or in the lifting direction and in that the counterforce brought about by the spring preferably increases linearly for an increasing deflection. Moreover, no or a negligibly small movement arises in the radial direction during the deflection, this means that the spring causes no rotation or a preferably negligibly small rotation of the end section, or of a part, such as a ram, connected to the end section, during the deflection. The spring constant of the linear bearing can be varied by a corresponding design of the spring arm section in a further region, in particular it is also impossible to design particularly smooth running linear bearings. The spring constant of the linear bearing can be influenced over a wide range, for example, it can be influenced by the length, the width and/or the thickness of the spring arm section and/or by the material used for the spring and/or by the number of springs used for a linear bearing. Also the maximum possible lifting path at a predefined magnet force is determined via the spring constant.

The invention will be described in the following by means of embodiments.

BRIEF DESCRIPTION OF THE DRAWINGS

The drawings used for explaining the embodiments show.

Generally all like parts are provided with like reference numerals in the drawings.

DETAILED DESCRIPTION OF THE INVENTION

Figure 1:
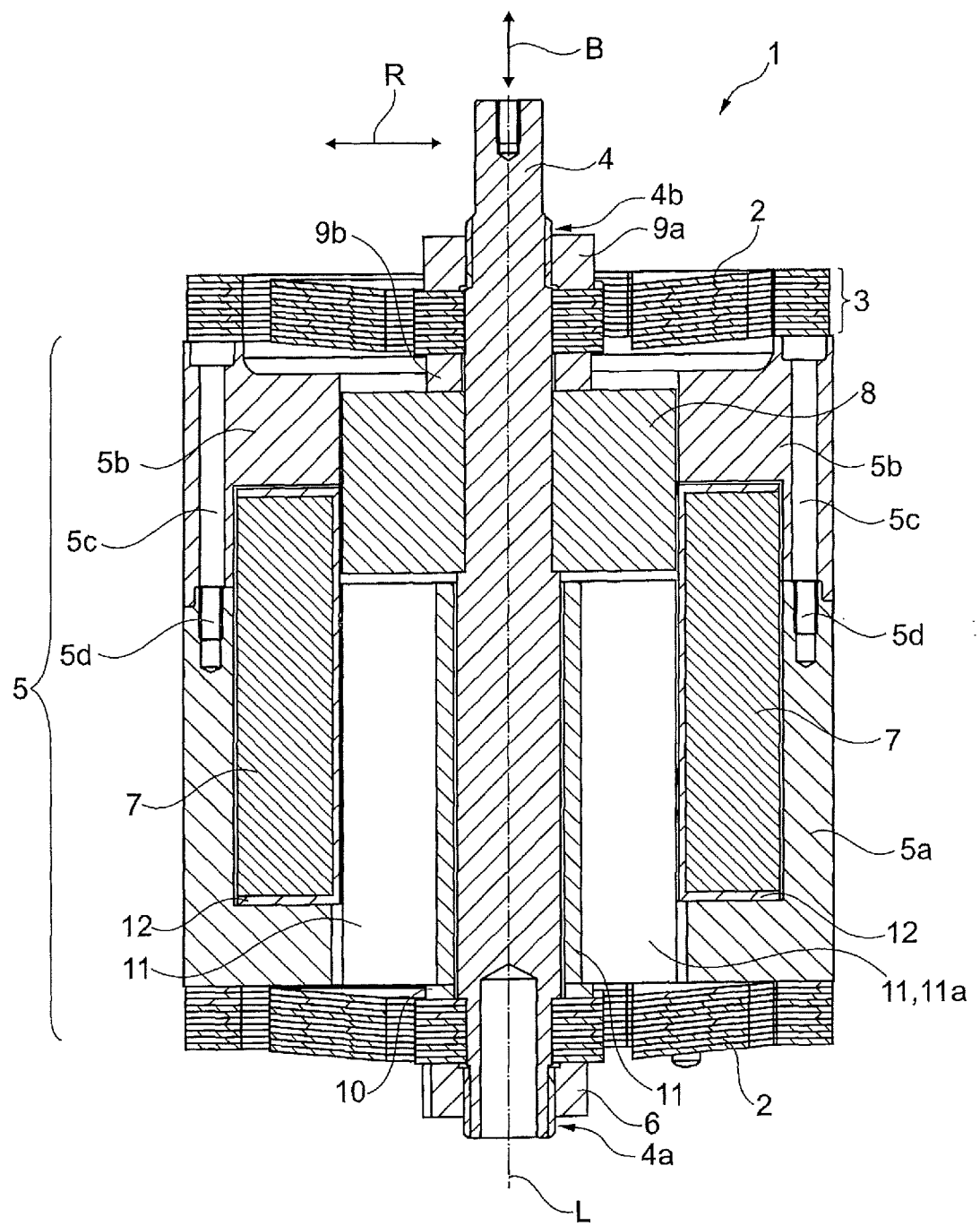
FIG. 1 a longitudinal section through a solenoid.

In a longitudinal section the FIG. 1 shows a solenoid 1 comprising a housing 5, two linear bearings 3 arranged spaced apart having springs 2, having a solenoid ram 4 extending in the longitudinal direction L, said ram being stored at the linear bearings 3 displaceable in the movement direction B with respect to the housing 5, as well as having an anchor 8 connected to the solenoid ram 4 and having an electromagnet 7 connected to the housing. The housing 5 comprises a lower housing part 5a, as well as an upper housing part 5b which are connected to one another via a screw 5c as well as via a thread 5d. A static iron core 11 having slits 11a is arranged in the housing fixed with respect to the housing 5, in contrast to which the anchor 8 is fixedly connected to the solenoid ram 4. The solenoid ram 4 is connected to the lower and/or to the upper linear bearing 3 via a fastening part 10, by means of a nut 6, as well as by means of the two fastening parts 9a, 9b. The electromagnet 7 is surrounded by an insulation means 12. The solenoid 1 is configured in such a way that a current flowing through the electromagnet 7 pulls the anchor 8 and thus the solenoid ram 4 downwardly, wherein the linear bearing 3 has a restoring force so that following the switching off of the electromagnet 7 the solenoid ram 4 again moves back into the illustrated position.

Figure 2:
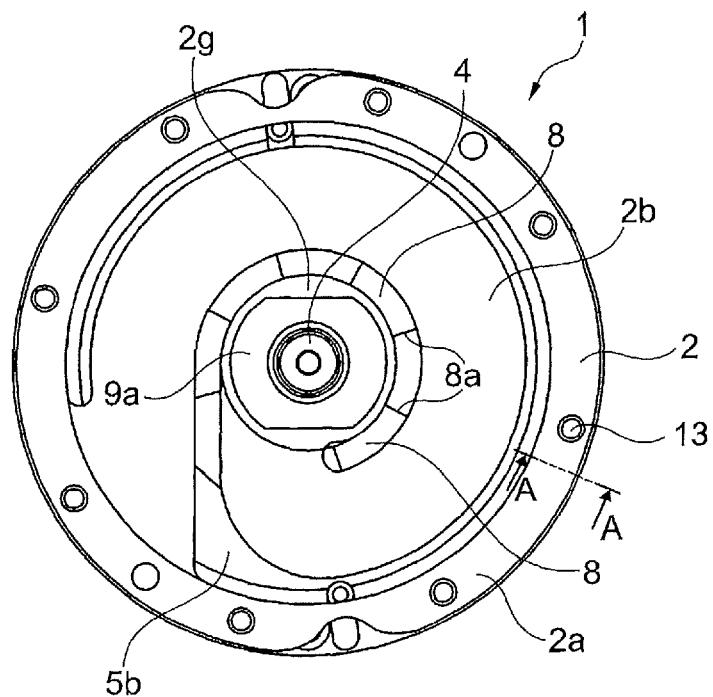
FIG. 2 a top view onto the solenoid in accordance with FIG. 1.

FIG. 2 shows a top view onto the solenoid 1 illustrated in FIG. 1. A spring 2 comprising a ring-shaped fastening part 2a, a spring part 2b, as well as an end section 2g is visible, with the solenoid ram 4 being connected to the end section 2g via the fastening part 9a. The fastening part 2a is fastened at the housing 5 with the aid of fastening means 13. Moreover, the upper housing part 5b, as well as the anchor 8 having the slits 8a is partly visible in FIG. 2.

Figure 3:
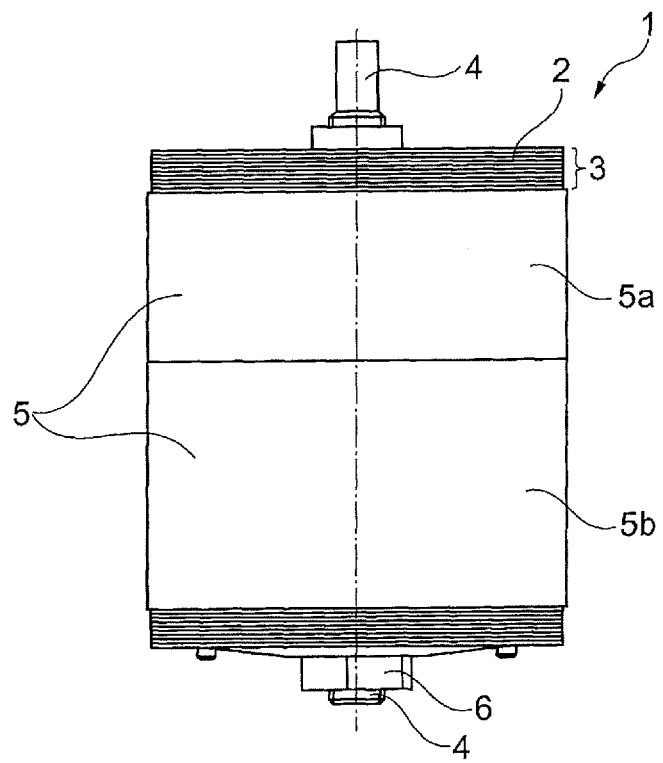
FIG. 3 a side view of the solenoid in accordance with FIG. 1.

FIG. 3 shows a side view of the solenoid 1 illustrated in FIG. 1 and FIG. 2.

Figure 4:
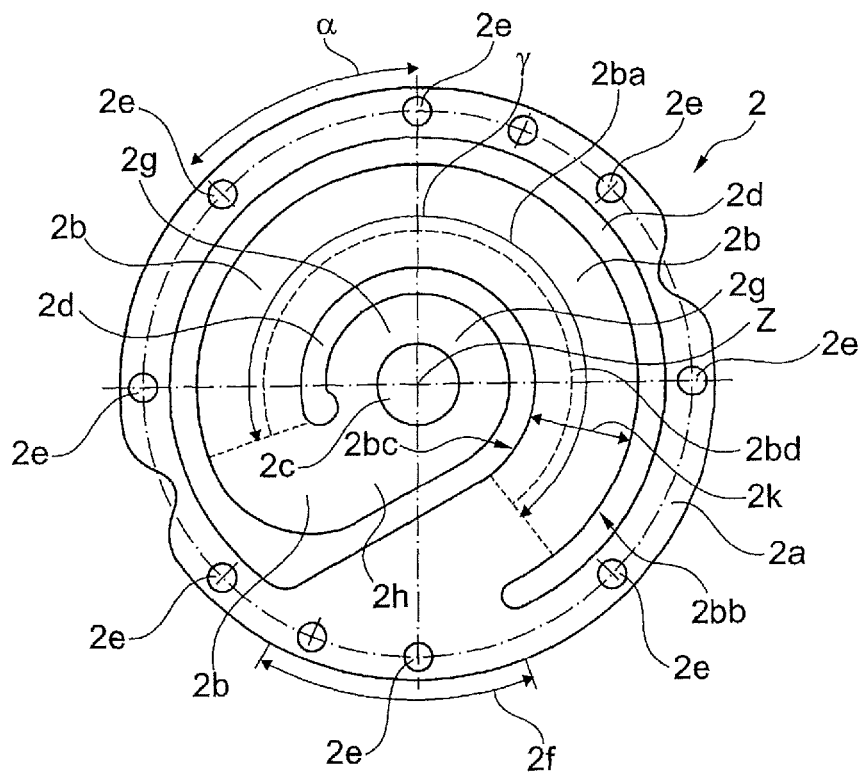
FIG. 4 a top view onto a spring element.

FIG. 4 in a top view shows the design of a single spring 2. The spring 2 is configured as a disk spring having a fastening part 2a and having a bore arranged in a center Z, wherein the spring 2 has a spring arm 2b which, starting from the fastening part 2a, ends in an end section 2g, wherein the end section 2g has the bore 2c. The bore 2c is arranged concentrically with respect to the fastening part 2a. The fastening part 2a is configured ring-shaped, extends over an angle of 360 degrees and has a plurality of bores 2e spaced apart in the circumferential direction. The bores 2e are preferably spaced apart uniformly, for example by a common angle α, so that adjacently arranged springs 2 can be arranged mutually rotated by the angle α or by a multiple of the angle α. The fastening part 2a can, for example, also only extend over a part angle and/or only be partly configured ring-shaped and extend, for example, over an angle in the range of between 20 degrees and 350 degrees. The spring arm 2b extends over an angular range of between 180° and 300°, wherein the spring arm 2b has a width 2k in a radial direction with respect to the bore 2c, said width being at least five times as large as the thickness 2i of the spring arm 2b extending in a spiral-shaped manner. The width 2k of the spring arm 2b is configured in such a way that this extends with respect to the ring-shaped fastening part 2a and the end section 2g on the formation of a lateral gap 2. The gap 2d is configured so wide that the spring arm section 2ba does not laterally contact the end section 2g and the fastening part 2a, with the gap 2d preferably having a width of at least 0.5 mm. The spring arm 2b is connected to the ring-shaped fastening part 2a along the angular range 2f.

The spring arm 2b comprises a spring arm section 2ba extending concentrically with respect to the bore 2c, said spring arm section extending over an angular range γ of between 100° and 270°. In the illustrated embodiment both the central line 2bd of the spring arm section 2ba, as well as also the outer lateral boundary 2bb and the inner lateral boundary 2bc run concentrically with respect to the center Z and/or run concentrically with respect to the bore 2c. This spring arm section 2ba has a constant width 2k in a radial direction with respect to the center Z. The end section 2g preferably comprises a connection section 2h, with the connection section 2h advantageously running in a radial direction with respect to the center Z and being fixedly connected to the spring arm section 2ba. The spring 2 is made of one piece. In a further advantageous embodiment the spring arm section 2ba could also extend over an angle γ in the range of between 180° and 300°.

The spring 2 has a movement direction B running perpendicular with respect to the fastening part 2a. A plurality of springs 2 are arranged following one another in the movement direction B having regard to the linear bearing 3 in accordance with the invention. Advantageously the individual springs 2 are arranged mutually displaced with respect to one another in the circumferential direction of the ring-shaped fastening part 2a, with the individual springs 2 being advantageously arranged mutually displaced by the same angle in the circumferential direction. The springs 2 are advantageously composed of metal, with the springs 2 advantageously having a thickness in the range of 0.1 mm to 5 mm in the movement direction B.

A linear bearing advantageously comprises at least four springs 2 and preferably comprises up to ten springs 2.

Figure 5:
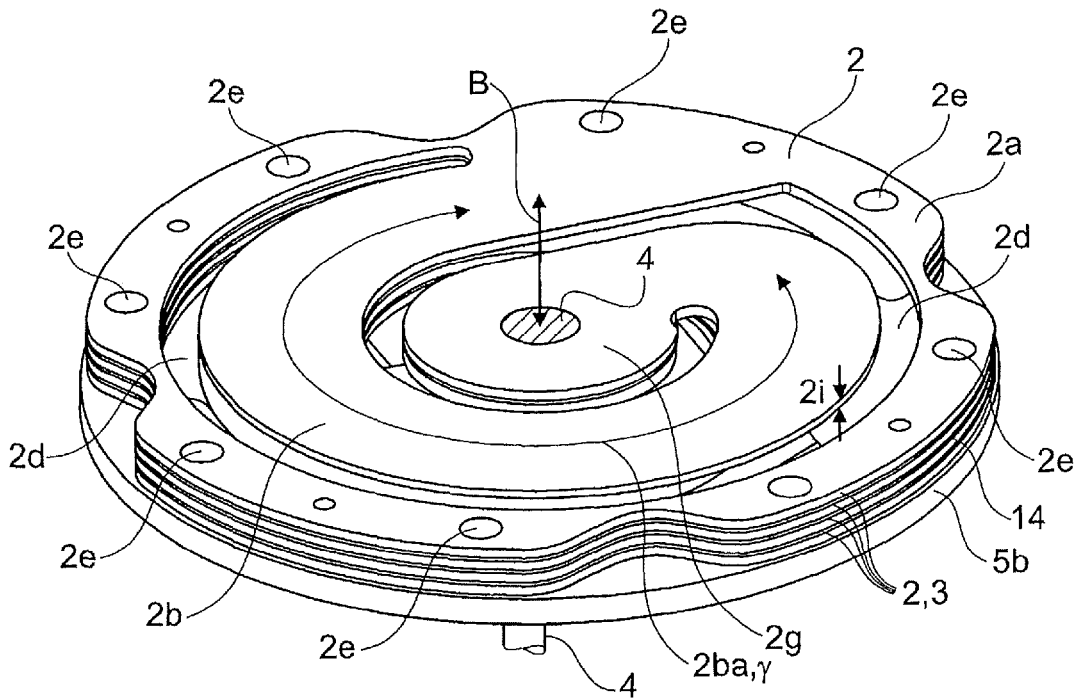
FIG. 5 a perspective view of the linear bearing.

In a perspective view FIG. 5 shows a linear bearing 3 comprising four springs 2, wherein the springs are arranged mutually rotated with respect to one another in the circumferential direction by 90 degrees. The linear bearing 3 is connected to the upper housing part 5b. The solenoid ram 4 is connected to the end section 2g of the springs 2, so that the solenoid ram 4 is displaceably stored in the movement direction B.

Figure 6:
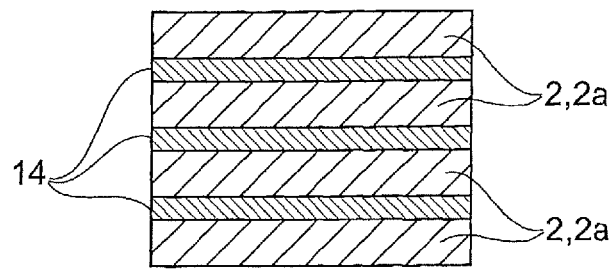
FIG. 6 a section through the linear bearing.

FIG. 6 shows a section along the section A-A illustrated in FIG. 2. FIG. 6 shows the ring-shaped fastening parts 2a of the springs 2 between which a respective spacer ring 14 is arranged.

Figure 7:
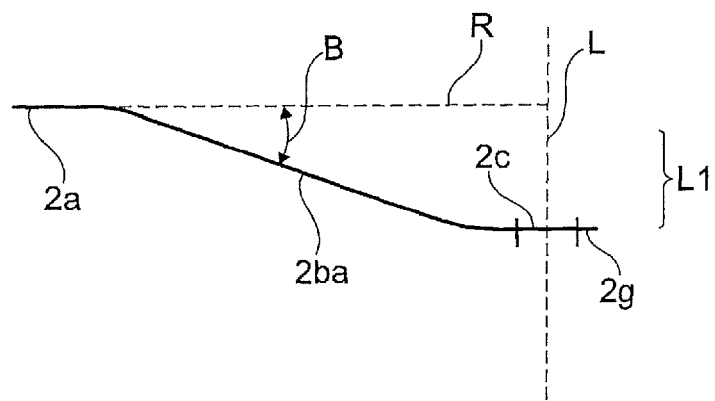
FIG. 7 a side view of a deflected spring element.

FIG. 7 shows the state of the springs 2 for a solenoid ram 4 displaced by the distance L1 in the longitudinal direction L. The deflected spring 2 is illustrated in a side view as well as in a coil. The spring 2 is connected to the housing 5 via the ring-shaped fastening part 2a and to the end section 2g having the solenoid ram 4, for which reason the fastening part 2a as well as the end section 2g mutually run in parallel in the illustration in accordance with FIG. 7. The spring arm section 2ba arranged there between has an inclination having an angle β with respect to the direction R running perpendicular to the longitudinal direction L. The spring arm section 2ba preferably has a constant gradient.

The solenoid 1 advantageously has a maximum lifting path B of between 0.4 mm and 5 mm, wherein the springs 2 are advantageously configured and arranged in such a way that the spring arm section 2ba has a gradient β of less than 15° for a maximum lifting path B in its direction of extent with respect to a direction R running perpendicular to the direction of extent L of the solenoid ram 4.

Figure 8:
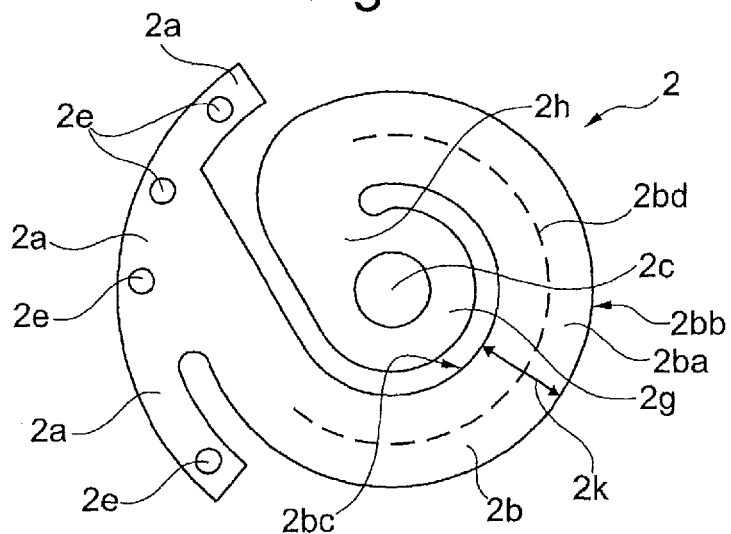
FIG. 8 a top view onto a further embodiment of a spring element.

In a top view, FIG. 8 shows a further embodiment of a spring element 2 whose fastening part 2a, in contrast to the embodiment illustrated in FIG. 4, is only partly of ring-shaped design so that the fastening part 2a only extends over a part angle of approximately 90 degrees. The fastening part 2a could be configured in such a way that the fastening part 2a extends over a part angle in the range of between 20 degrees and 350 degrees in the circumferential direction. The fastening part 2a can also extend over a range of 360 degrees as is illustrated in FIG. 4, so that the fastening part 2a is configured ring-shaped.

Figure 9:
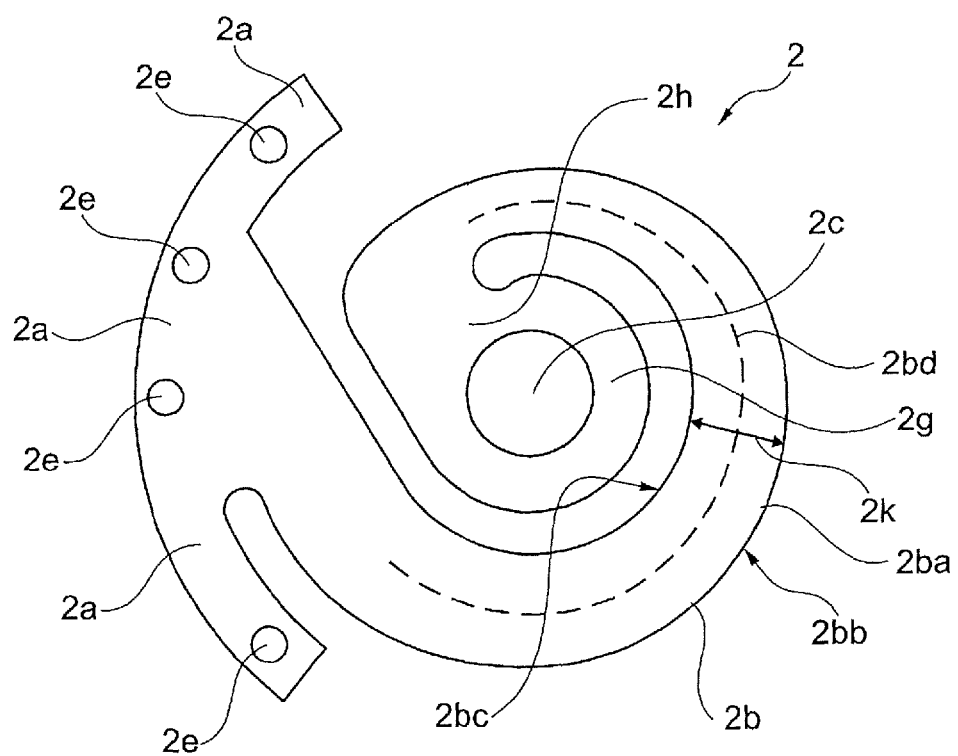
FIG. 9 a top view onto a further embodiment of a spring element.

In a top view FIG. 9 shows a further embodiment of a spring element 2. In turn the spring arm 2b again comprises a spring arm section 2ba arranged concentrically with respect to the bore 2c and/or concentrically with respect to the center Z, wherein it is to be understood such that "concentrically extending" means that at least the central line 2bd of the spring arm section 2ba runs concentrically with respect to the bore 2c and/or concentrically with respect to the center Z. The embodiments illustrated in FIGS. 4 and 8 have an outer lateral boundary 2bb and an inner lateral boundary 2bc which run concentrically with respect to the center Z, so that the spring arm section 2ba has a constant width 2k with respect to the center Z in a radial direction. In contrast to the embodiment illustrated in FIG. 8 the spring arm section 2ba illustrated in FIG. 9 is configured in such a way that its central line 2bd again runs concentrically with respect to the center Z, in contrast to which the outer and the inner lateral boundaries 2bb, 2bc extend in such a way that the width 2k of the spring arm section 2ba, as is illustrated in FIG. 9, reduces towards the end section 2g and/or reduces towards the connection section 2h and preferably reduces continuously. The spring arm section 2ba could, however, also be configured in such a way that its width 2k increases towards the connection section 2h and preferably increases continuously. The spring arm section 2ba could, however, also be configured in such a way that its width 2k varies towards the connection section 2h and increases section-wise and decreases section-wise. Such designs enable the configuration of the spring arm section 2ba having a varying spring constant along the spring arm section 2ba, in particular an increasing or a decreasing spring constant along the spring arm section 2ba.

What is claimed is:

1. A linear bearing (3) comprising:
a plurality of concentrically arranged springs (2), wherein each spring (2) is configured as a disk spring having a fastening part (2a) and a bore (2c) arranged in a center (Z), wherein the fastening part (2a) is configured at least partly ring-shaped;
wherein each spring (2) further comprises a spring arm (2b) which, starting from the fastening part (2a), ends in an end section (2g), wherein the end section (2g) has the bore (2c) and wherein the bore (2c) is concentrically arranged with respect to the fastening part (2a);
wherein each spring (2) has a movement direction (B) running perpendicular to the fastening part (2a), and wherein the springs (2) are arranged following one another in the movement direction (B);
wherein the spring arm (2b) has a spring arm section (2ba) with a central line (2bd) running concentrically with respect to the center (Z), the spring arm section (2ba) with central line (2bd) extending over an angular range (γ) of between 100° and 300°;
wherein the central line (2bd) runs concentrically, and with a constant, radial distance with respect to the center (Z), and wherein the spring arm section (2ba) has a width (2k) in a radial direction with respect to the center (Z), said width being at least five times larger than the thickness (2i) of the spring arm (2b); and
wherein the width (2k) of the spring arm section (2ba) is configured such that it extends with respect to the ring-shaped fastening part (2a) and the end section (2g) on the formation of a lateral gap (2d).

2. The linear bearing in accordance with claim 1, wherein the spring arm section (2ba) has a constant width (2k) in a radial direction with respect to the center (Z).

3. The linear bearing in accordance with claim 1, wherein the spring arm section (2ba) has, in a radial direction with respect to the center (Z), a decreasing width (2k) along the angular range (γ).

4. The linear bearing in accordance with claim 1, wherein the end section (2g) has a connection section (2h) running radially with respect to the center (Z) between the spring arm (2b) and the bore (2c).

5. The linear bearing in with claim 1, wherein a spacer ring (14) is arranged between two ring-shaped fastening parts (2a) of two springs (2) arranged next to one another in the movement direction (B).

6. The linear bearing in accordance with claim 1, wherein the springs (2) are arranged mutually displaced in the circumferential direction of the ring-shaped fastening part (2a).

7. The linear bearing in accordance with claim 6, wherein each of the springs (2) is arranged mutually displaced by the same angle in the circumferential direction.

8. The linear bearing in accordance with claim 1, wherein each spring (2) is composed of metal, and wherein the spring (2) has a thickness in the range of 0.1 mm to 5 mm in the movement direction (B).

9. The linear bearing in accordance with claim 1, wherein the bearing comprises at least four springs (2).

10. The linear bearing in accordance with claim 1, wherein the fastening part (2a) is configured ring-like and extends over 360 degrees.

11. A solenoid (1) comprising a linear bearing (3) in accordance with claim 1.

12. The solenoid (1) in accordance with claim 11, further comprising a housing (5) as well as two linear bearings (3) arranged mutually spaced apart in the movement direction (B), the linear bearings being connected to the housing (5), as well as comprising a solenoid ram (4) which extends through the bores (2c) and which is connected to the two linear bearings (3), wherein an anchor (8) is connected to the solenoid ram (4) and wherein an electromagnet (7) is arranged in the housing (5) with respect to the anchor (8) in such a way that the electromagnet (7) attracts the anchor (8) when the electromagnet is energized.

13. The solenoid in accordance with any one of claim 11 or claim 12 having a maximum lifting path (B) of between 0.4 mm and 5 mm, and wherein the springs (2) are configured and arranged such that the spring arm section (2ba) has an inclination of less than 15° in its movement direction for the maximum lifting path (B) with respect to a direction (R) extending perpendicular to the direction of movement (L) of the solenoid ram (4).

14. The solenoid in accordance with claim 12, wherein at least one linear bearing (3) is arranged biased with respect to the movement direction (B).

* * * * *